(12) United States Patent
Li et al.

(10) Patent No.: US 11,182,581 B2
(45) Date of Patent: Nov. 23, 2021

(54) TOUCH PANEL, MANUFACTURING METHOD THEREOF AND DISPLAY DEVICE

(71) Applicants: KunShan Go-Visionox Opto-Electronics Co., Ltd., Kunshan (CN); Yungu (Gu'an) Technology Co., Ltd., Langfang (CN)

(72) Inventors: Weiguo Li, Jiangsu (CN); Lufangyue Ji, Jiangsu (CN); Shengzu Zhu, Jiangsu (CN); Zhihua Zhang, Jiangsu (CN); Guizhou Qiao, Jiangsu (CN); Jianping Chen, Jiangsu (CN)

(73) Assignees: KUNSHAN GO-VISIONOX OPTO-ELECTRONICS CO., LTD., Kunshan (CN); YUNGU (GU'AN) TECHNOLOGY CO., LTD, Langfang (CN)

( * ) Notice: Subject to any disclaimer, the term of this patent is extended or adjusted under 35 U.S.C. 154(b) by 20 days.

(21) Appl. No.: 16/424,957

(22) Filed: May 29, 2019

(65) Prior Publication Data
US 2019/0294846 A1 Sep. 26, 2019

Related U.S. Application Data

(63) Continuation of application No. PCT/CN2018/103500, filed on Aug. 31, 2018.

(30) Foreign Application Priority Data

Dec. 29, 2017 (CN) .......................... 201711489859.3
Dec. 29, 2017 (CN) .......................... 201711489863.X

(51) Int. Cl.
*G06K 9/00* (2006.01)
*G06F 3/044* (2006.01)
(Continued)

(52) U.S. Cl.
CPC .......... *G06K 9/0002* (2013.01); *G06F 3/041* (2013.01); *G06F 3/0412* (2013.01);
(Continued)

(58) Field of Classification Search
CPC .......... G06K 9/0002; G06K 9/24; G06K 9/00; G06F 3/041; G06F 3/0445; G06F 3/0446;
(Continued)

(56) References Cited

U.S. PATENT DOCUMENTS 9,851,836 B2 * 12/2017 Lin .................... G06F 3/0416
2013/0135247 A1 * 5/2013 Na ...................... G06F 21/32
345/174
(Continued)

FOREIGN PATENT DOCUMENTS

CN 101446877 A 6/2009
CN 105159506 A 12/2015
(Continued)

OTHER PUBLICATIONS

Machine generated English translation of CN 107392168.
(Continued)

*Primary Examiner* — David D Davis
(74) *Attorney, Agent, or Firm* — Ladas & Parry LLP

(57) ABSTRACT

The present application relates to the field of touch technologies, and particularly to a touch panel, a manufacturing method thereof, and a display device. A touch panel, includes: a touch film layer and a fingerprint recognition film layer, an orthographic projection of the fingerprint recognition film layer on the touch panel at least partially coincides with an orthographic projection of the touch film layer on the touch panel.

19 Claims, 9 Drawing Sheets

(51) Int. Cl.
  *G06F 3/041* (2006.01)
  *G06K 9/24* (2006.01)
(52) U.S. Cl.
  CPC .......... *G06F 3/0445* (2019.05); *G06F 3/0446* (2019.05); *G06K 9/00* (2013.01); *G06K 9/24* (2013.01); *G06F 2203/04103* (2013.01); *G06F 2203/04111* (2013.01)
(58) Field of Classification Search
  CPC ......... G06F 3/0412; G06F 2203/04103; G06F 2203/04111; G06F 2203/04112; G06F 3/0448
  See application file for complete search history.

(56) References Cited

U.S. PATENT DOCUMENTS

| | | | |
|---|---|---|---|
| 2014/0047706 A1 | 4/2014 | Shaikh et al. | |
| 2014/0104234 A1 | 4/2014 | Chang | |
| 2015/0074809 A1 | 3/2015 | Thomas et al. | |
| 2017/0091508 A1* | 3/2017 | Han | G06F 3/041 |
| 2017/0147850 A1* | 5/2017 | Liu | G06K 9/00087 |
| 2018/0025209 A1* | 1/2018 | Lee | B31B 50/60 |

FOREIGN PATENT DOCUMENTS

| | | |
|---|---|---|
| CN | 106557216 A | 4/2017 |
| CN | 107392168 A | 11/2017 |
| CN | 107425041 A | 12/2017 |
| CN | 107437045 A | 12/2017 |
| CN | 108021288 A | 5/2018 |
| CN | 108089757 A | 5/2018 |
| TW | 201608425 A | 3/2016 |
| TW | 201643670 A | 12/2016 |

OTHER PUBLICATIONS

Machine generated English translation of CN 106557216.
Machine generated English translation of CN 105159506.
Machine generated English translation of CN 101446877.
International Search Report in International Application No. PCT/CN2018/103500.
Written Opinion of the International Search Authority in International Application No. PCT/CN2018/103500.
CN107425041A_Espacenet_English_Abstract.
CN107437045A_Espacenet_English_Abstract.
CN108089757A_Espacenet_English_Abstract.
CN108021288A_Espacenet_English_Abstract.

* cited by examiner

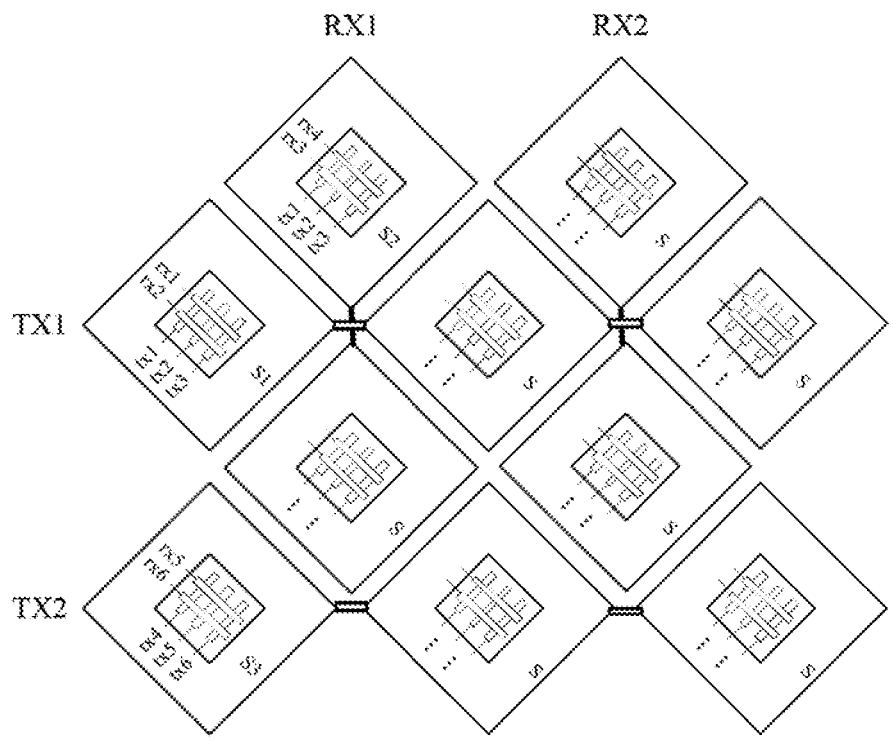
FIG. 2 ( a )
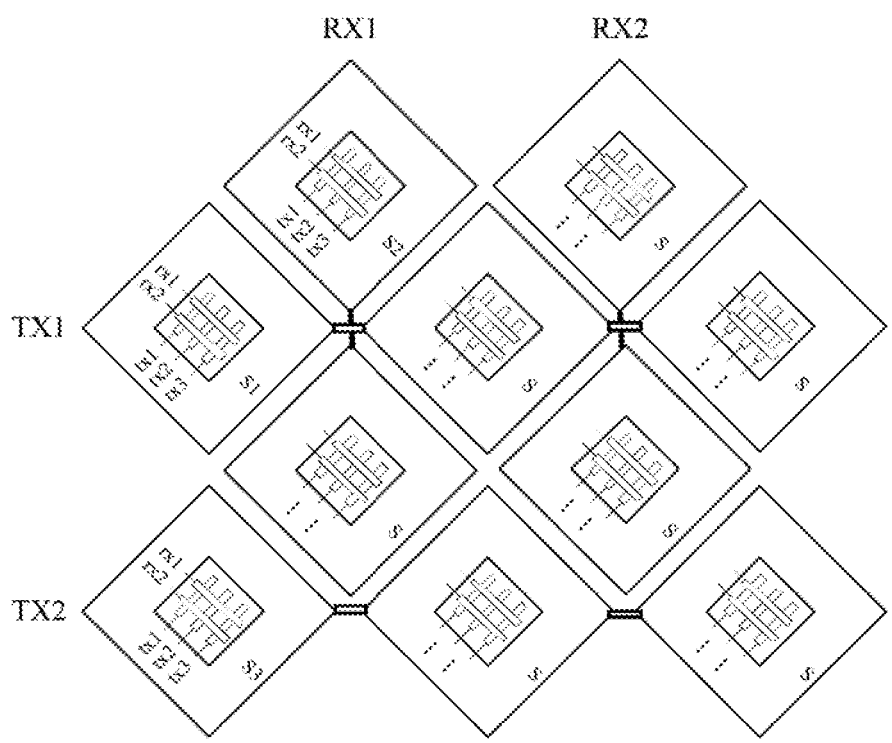
FIG. 2 ( b )

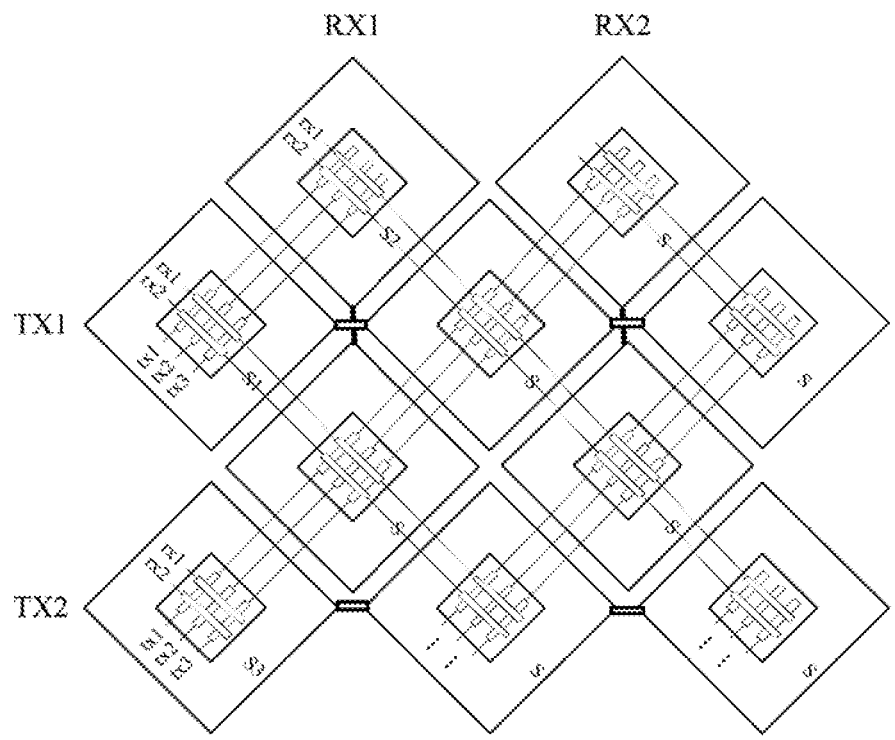
FIG. 2 ( c )
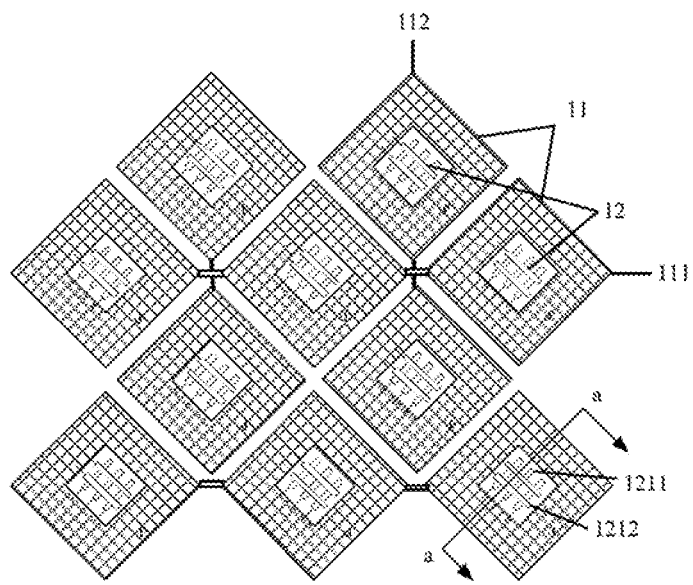
FIG. 3

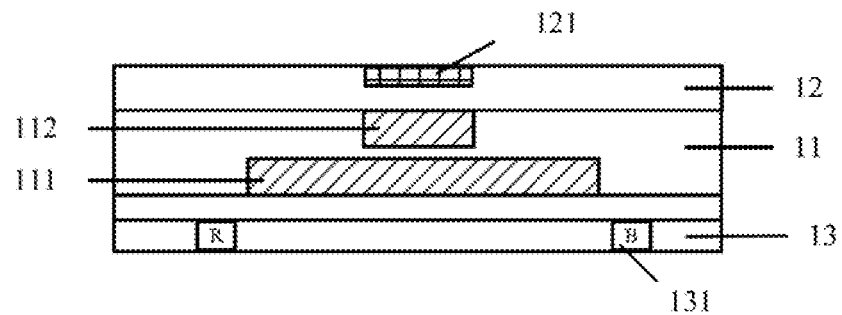
FIG. 5 ( b )
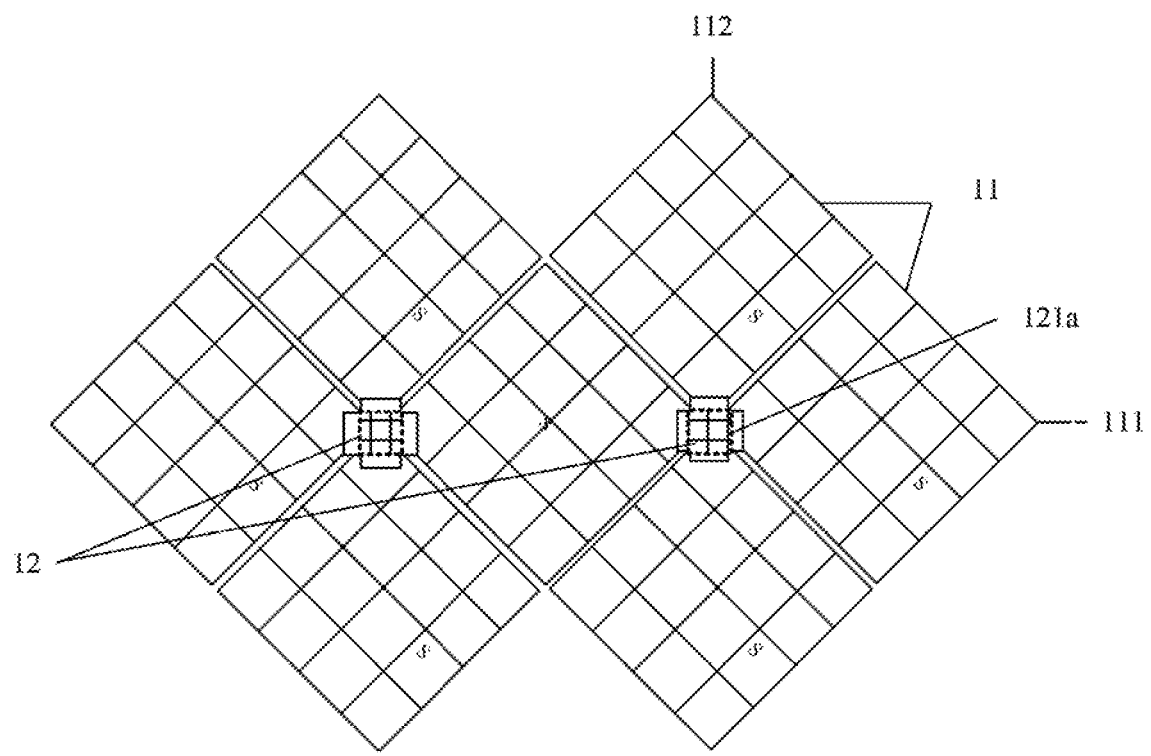
FIG. 6

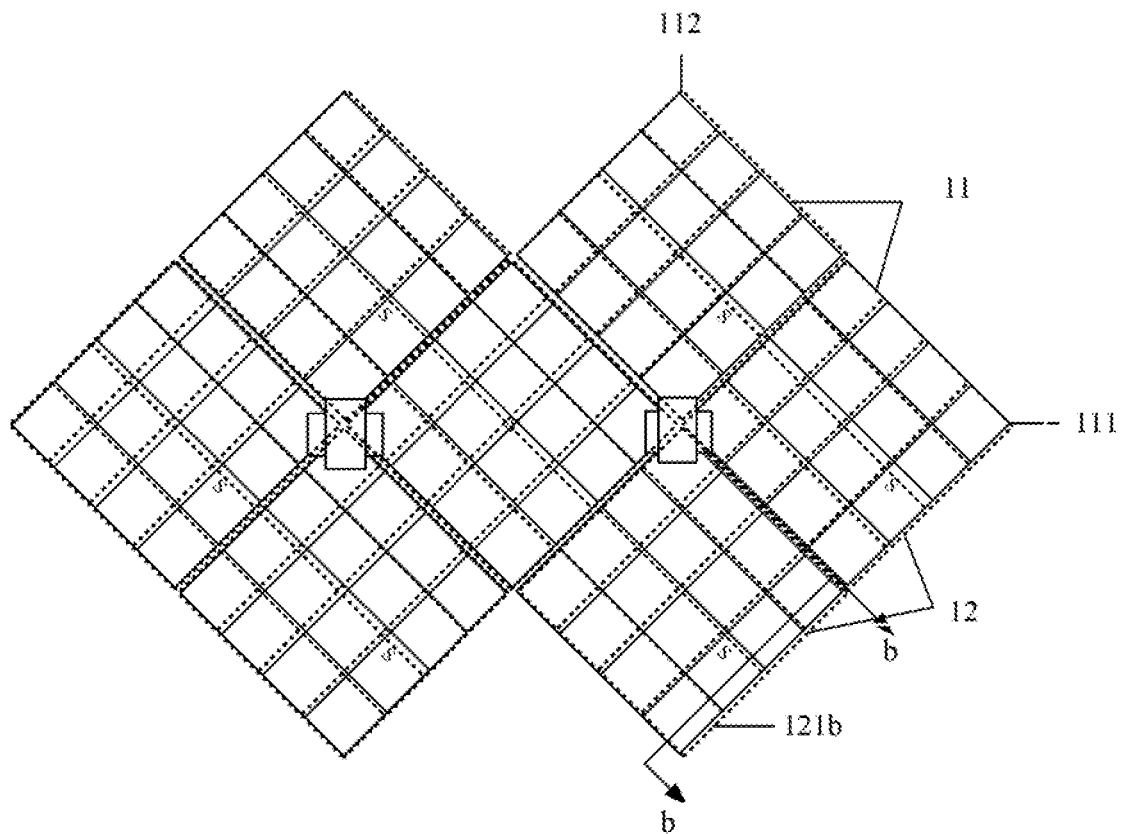
FIG. 7 ( a )
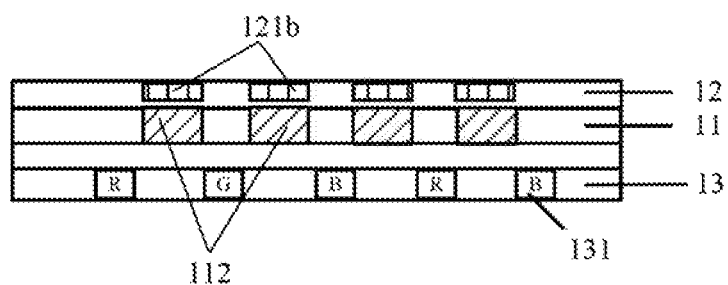
FIG. 7 ( b )

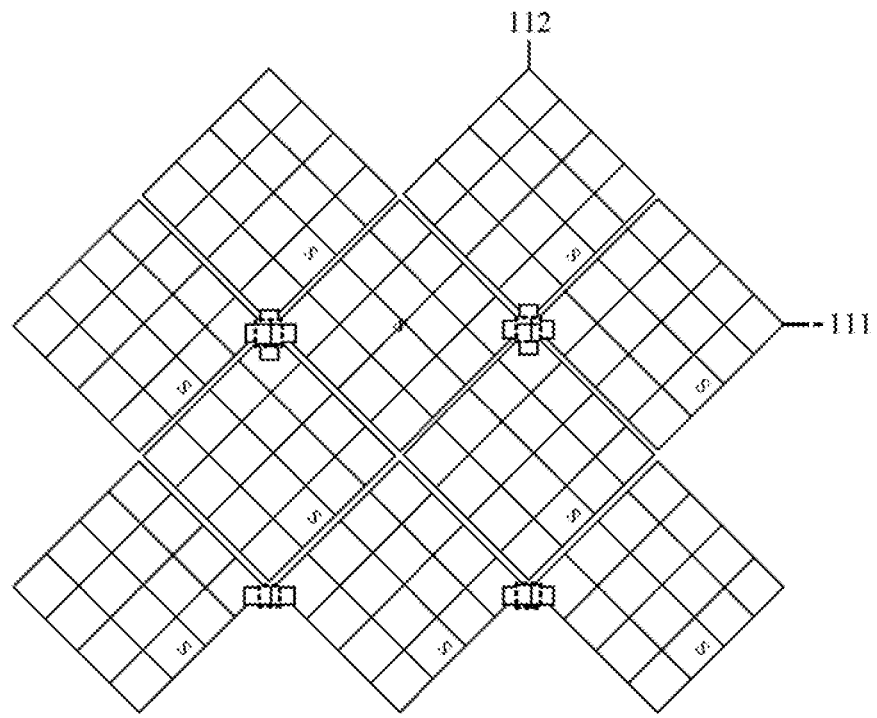
FIG. 10 ( a )
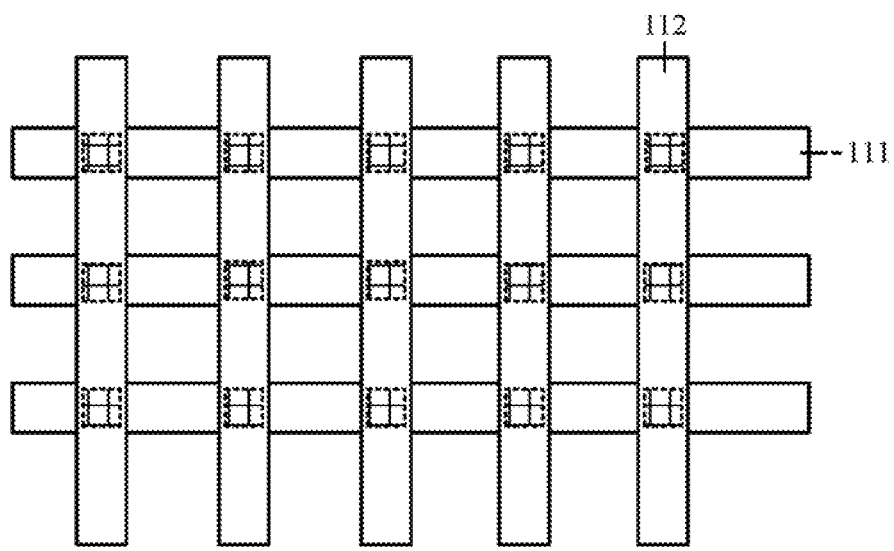
FIG. 10 ( b )

TOUCH PANEL, MANUFACTURING METHOD THEREOF AND DISPLAY DEVICE

CROSS-REFERENCE TO RELATED APPLICATIONS

This application is a continuation application of International Application No. PCT/CN2018/103500 filed on Aug. 31, 2018, the disclosures of which are incorporated in their entirety by reference herein. This application claims priority to Chinese Patent Application No. 201711489863.X, with a title "TOUCH PANEL, MANUFACTURING METHOD THEREOF AND DISPLAY DEVICE", and Application No. 201711489859.3, with a title "TOUCH PANEL AND TOUCH DISPLAY DEVICE", filed on Dec. 29, 2017, the entire contents of which are hereby incorporated by reference.

TECHNICAL FIELD

The application relates to the field of touch technology, and particularly to a touch panel, a manufacturing method thereof, and a display device.

BACKGROUND TECHNOLOGY

At present, in a display panel with a fingerprint recognition function, a fingerprint recognition module is generally arranged in a non-display region of the display panel, and is mostly arranged at a position corresponding to an exposed Home button. The fingerprint recognition module collects fingerprint information of a user when the user touches the Home button through a finger, then completes fingerprint recognition based on comparison results.

However, arranging the fingerprint recognition module in the non-display region will inevitably limit a full screen design of the display panel, which does not facilitate realizing the full screen of the display panel.

Therefore, it is Urgent to Find a Full Screen Solution that can Realize Fingerprint Recognition.

SUMMARY

The embodiments of the application provide a touch panel, a manufacturing method thereof, and a display device to overcome the above technical problem.

In order to overcome the above technical problem, an embodiment of the application can adopt the following technical solution.

A touch panel comprising: a touch film layer and a fingerprint recognition film layer; an orthographic projection of the fingerprint recognition film layer on the touch panel at least partially coincides with an orthographic projection of the touch film layer on the touch panel, or the orthographic projection of the fingerprint recognition film layer on the touch panel is located in at least one predetermined hollow region of the touch film layer.

Optionally, the fingerprint recognition film layer comprises a plurality of fingerprint recognition patterns arranged in an array, and an orthographic projection of the fingerprint recognition pattern on the touch panel at least partially coincides with the orthographic projection of the first electrode and the second electrode in the touch film layer on the touch panel.

Optionally, the fingerprint recognition pattern comprises a first fingerprint recognition pattern; an orthographic projection of the first fingerprint recognition pattern on the touch panel is located at an insulating and intersecting region of the first electrode and the second electrode.

Optionally, the first fingerprint recognition pattern has an area of 1-4 mm$^2$.

Optionally, the fingerprint recognition pattern comprises a second fingerprint recognition pattern; each of the first electrode and the second electrode comprises a plurality of grid electrodes with a hollow pattern, an orthographic projection of the second fingerprint recognition pattern on the touch panel coincides with an orthographic projection of the hollow pattern of the grid electrode on the touch panel.

Optionally, the second fingerprint recognition pattern has an area of 1-16 mm$^2$.

Optionally, the fingerprint recognition pattern comprises a plurality of third metal electrodes and a plurality of fourth metal electrodes which are insulated and intersect with the third metal electrodes; a line width of the third metal electrode and the fourth metal electrode is in a range of 3-5 μm.

Optionally, the first electrode and the second electrode in the touch film layer are arranged crossedly in the same layer or are arranged to overlap in different layers.

Optionally, the orthographic projection of the leads connecting to the fingerprint recognition pattern on the touch panel coincides with the orthographic projection of the first electrode and/or the second electrode in the touch film layer on the touch panel.

Optionally, the fingerprint recognition pattern is arranged at either side of the touch film layer or is arranged between the first electrode and the second electrode of the touch film layer. Optionally, the touch film layer comprises a plurality of first electrode patterns extending along a first direction, and a plurality of second electrode patterns extending along a second direction and configured being insulated and intersecting with the first electrode pattern; the fingerprint recognition film layer comprises a plurality of fingerprint recognition patterns, and an orthographic projection of the fingerprint recognition pattern on the touch panel is located in a hollow region of the electrode pattern of the touch film layer, each fingerprint recognition pattern comprises a plurality of fingerprint driving electrodes extending in a third direction, and a plurality of fingerprint sensing electrodes extending in a fourth direction; the fingerprint driving electrodes are insulated and intersect with the fingerprint sensing electrode.

Optionally, the fingerprint recognition pattern is insulatedly embedded in the hollowed region.

Optionally, in the fingerprint recognition film layer, the leads of each fingerprint driving electrode are connected to different first pins correspondingly, and the leads of each fingerprint sensing electrode are connected to different second pins correspondingly.

Optionally, in every fingerprint recognition patterns, the leads of each fingerprint driving electrode are connected to different first pins correspondingly, and the leads of each fingerprint sensing electrode are connected to different second pins correspondingly; each of the fingerprint recognition patterns is provided with the fingerprint driving electrode and the fingerprint sensing electrode, the fingerprint driving electrodes from different fingerprint recognition patterns are commonly connected to the same first pin, and the fingerprint sensing electrodes from different fingerprint recognition patterns are commonly connected to the same second pin.

Optionally, in the fingerprint recognition patterns, the leads of the fingerprint driving electrode and the leads of the fingerprint sensing electrode are drawn from either side of the electrode unit; or the leads of the fingerprint driving electrode and leads of the fingerprint sensing electrode are respectively drawn from both sides of the electrode unit.

Optionally, further comprising: a display film layer, the display film layer comprises a plurality of illuminating sub-pixels arranged in an array, in the fingerprint recognition pattern, an orthographic projection of each of the fingerprint driving electrodes and/or of each of the fingerprint sensing electrodes on the touch panel does not coincide with an orthographic projection of the illuminating sub-pixels in the display film layer on the touch panel.

Optionally, the fingerprint recognition pattern is made of a transparent conductive material or a metal material.

Optionally, in the touch film layer, the central spacing of adjacent electrode units ranges from 3 to 7 mm; in the fingerprint recognition film layer, the central spacing of the adjacent fingerprint recognition patterns ranges from 3 to 7 mm.

A touch display device, comprising the touch panel.

A method of manufacturing a touch panel, comprising: forming a touch film layer with at least one predetermined hollow region; forming a fingerprint recognition film layer, an orthographic projection of the fingerprint recognition film layer on the touch panel is located in at least one predetermined hollow region of the touch film layer.

The following beneficial effects can be achieved by the above-mentioned at least one technical solution adopted by the embodiments of the application: in one embodiment of the application, fingerprint recognition patterns are arranged in a hollow region of each electrode unit of the entire touch film layer, so that the fingerprint recognition patterns are distributed on the entire surface of the touch film layer, the recognition of the fingerprint can be achieved by the capacitance formed by the fingerprint recognition patterns in the intersection position of the fingerprint driving electrode and the fingerprint sensing electrode, thereby avoiding the problem of capacitive interference between the touch film layer and the fingerprint recognition film layer. The fingerprint recognition can be implemented in each region on the touch panel, thereby avoiding the limitation to the fingerprint recognition caused by only setting the fingerprint recognition module in a specific position of the non-display region of the panel, and the solution is beneficial to realize the full screen of the panel, and improve the touch of the touch panel and the quality of fingerprint recognition.

In another embodiment of the application, the fingerprint recognition of the entire screen is realized by arranging a plurality of fingerprint recognition patterns on the touch panel. The fingerprint recognition film layer being arranged on the position corresponding to the electrode pattern in the corresponding touch film layer can prevent the fingerprint recognition film layer from shielding the emergent light of the illuminating sub-pixel in the display film layer, thereby ensuring the luminous efficiency of the touch panel and improving the quality of the touch panel while realizing the full screen fingerprint recognition.

BRIEF DESCRIPTION OF THE DRAWINGS

The drawings described herein are intended to provide a further understanding of the application, and are intended to be a part of this application. The illustrative embodiments of the application and the description thereof are intended for explaining the application and do not constitute an undue limitation to the application. In the drawings:

FIG. 2(a) is a first partial schematic structural view of a touch panel provided by an embodiment of the application;

FIG. 2(b) is a second partial schematic structural view of a touch panel provided by an embodiment of the application;

FIG. 2(c) is a third partial schematic structural view of a touch panel provided by an embodiment of the application;

FIG. 3 is a second schematic structural view of a touch panel provided by an embodiment of the application;

FIG. 6 is a first schematic structural view of a touch panel provided by another embodiment of the application;

FIG. 7(a) is a second schematic structural view of a touch panel provided by another embodiment of the application;

FIG. 7(b) is a second cross-sectional schematic structural view of a touch panel provided by another embodiment of the application;

FIGS. 10(a) and 10(b) are respectively schematic structural views showing two structures of a touch film layer in a touch panel provided by another embodiment of the application.

DETAILED DESCRIPTION OF PREFERRED EMBODIMENTS

In order to make the objects, the technical solution and the advantages of the application clearer, the technical solution of the application will be clearly and completely described in the following with reference to the specific embodiments of the application and the corresponding drawings. It is apparent that the described embodiments are only a part of the embodiments of the application rather than all of them. All other embodiments obtained by a person skilled in the art based on the embodiments of the application without paying creative work fall into the protection scope of the application.

In order to solve the above limitation problem, a fingerprint recognition film layer may be arranged on the entire touch panel, and a fingerprint recognition module may be arranged in a gap between a touch driving electrode and a touch sensing electrode of the touch panel in consideration of the light shielding problem, but only for the gap generated by intersecting of the touch driving electrode and the touch sensing electrode is sufficiently large. However, when the touch driving electrode and the touch sensing electrode are designed as a single layer and have intersected electrodes with a bridge structure, the gap between the touch driving electrode and the touch sensing electrode is relatively small, and a central spacing between adjacent gaps is large, thus the fingerprint recognition film layer can't be effectively designed. Accordingly, regarding to a single-layer touch film layer with a bridge structure, a structure where a print recognition pattern is embedded insulatively in a hollow region of an electrode unit of the touch driving electrode and the touch sensing electrode is designed in the application. In addition, in the application, a position of the fingerprint recognition pattern is also set, so that an orthographic projection of the fingerprint recognition pattern on the touch panel at least partially coincides with an orthographic projection of the first electrode and the second electrode of touch film layer on the touch panel, so that a similar design can be implemented on the electrode units of the entire touch panel, to ensure that a capacitive fingerprint recognition on the entire touch panel can be achieved on the touch film layer, even on a single layer of the touch film layer.

The technical solution provided by the embodiments of the application is described in detail below with reference to the accompanying drawings.

Figure 1:
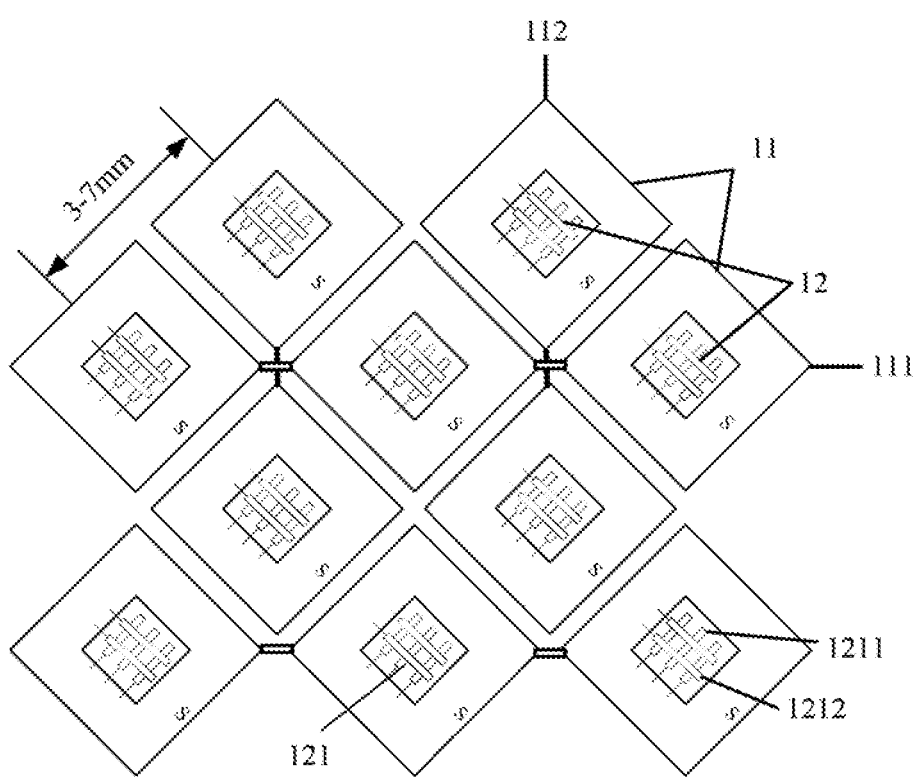
FIG. 1 is a first schematic structural view of a touch panel provided by an embodiment of the present application.

An embodiment of the application can be referred to FIG. 1. FIG. 1 is a schematic structural view of a touch panel provided by an embodiment of the present application. The touch panel mainly includes: a touch film layer 11 and a fingerprint recognition film layer 12. An orthographic projection of the fingerprint recognition film layer 12 on the touch panel is located at least one predetermined hollow region of the touch film layer 11.

The fingerprint recognition film layer 12 may be arranged on the touch film layer 11, and may be arranged on any side of the touch film layer 11 or on other film layers. The positional relationship of film layer of the fingerprint recognition film layer 12 is not limited in the application.

Optionally, in the application, also referring to FIG. 1, the touch film layer 11 includes a plurality of first electrode patterns 111 extending along a first direction, and a plurality of second electrode patterns 12 extending along a second direction and being insulated and intersecting with the first electrode pattern 111; the first electrode pattern 11*l* includes a plurality of electrode units S and a connecting unit (the numeral is not shown) connecting the adjacent electrode units S. The second electrode pattern 112 includes a plurality of electrode units S and a bridge unit (the numeral is not shown) connecting the adjacent electrode units S; the fingerprint recognition film layer 12 includes a plurality of fingerprint recognition patterns 121 which are insulatively embedded in a hollow region of each electrode unit S (the region enclosed by the solid line frame in FIG. 1). Each fingerprint recognition pattern 121 includes a plurality of fingerprint driving electrodes 1211 extending in a third direction, and a plurality of fingerprint sensing electrodes 1212 extending in a fourth direction. The fingerprint driving electrodes 1211 are insulated and intersect with the fingerprint sensing electrode 1212.

It should be noted that, in the application, the touch film layer may also be arranged as intersecting strip-like electrodes. A fingerprint recognition pattern is arranged at a position corresponding to the hollow region of the strip-like electrodes.

In fact, in the application, an electrode unit of the first electrode pattern and the second electrode pattern of the touch film layer may be in a grid pattern. A planar capacitance is formed in the horizontal panel of the touch panel by the electrode unit of the first electrode pattern and the electrode unit of the second electrode pattern. The intersection position is connected by a bridge structure. The capacitance formed by the fingerprint recognition patterns embedded in the electrode unit does not interfere with the touch panel which facilitates the integration of the touch and the fingerprint recognition structure.

The wiring of the fingerprint driving electrode 1211 and the fingerprint sensing electrode 1212 is relatively tight, and the density of the hollow pattern formed by the fingerprint driving electrode 1211 and the fingerprint sensing electrode 1212, for example the density of the cross grid, is large. The line widths of the fingerprint driving electrode 1211 and the fingerprint sensing electrode 1212 are both less than 5 μm, thus it is adapted to the ridge ribs of the user's fingerprint (i.e., concave and convex lines of the fingerprint) to collect more accurate fingerprint information. The fingerprint driving electrode 1211 and the fingerprint sensing electrode 1212 may be provided with a transparent insulating material at the intersection position. The fingerprint driving electrode 1211 and the fingerprint sensing electrode 1212 may be arranged in the same layer or in different layers, which is not limited thereto in the application.

By the above technical solution, fingerprint recognition patterns are arranged in a hollow region of each electrode unit of the entire touch film layer, so that the fingerprint recognition patterns are distributed on the entire surface of the touch film layer, the recognition of the fingerprint can be achieved by the capacitance formed by the fingerprint recognition pattern in the intersection position of the fingerprint driving electrode and the fingerprint sensing electrode, thereby avoiding the problem of capacitive interference between the touch film layer and the fingerprint recognition film layer. The fingerprint recognition can be implemented in each region on the touch panel, thereby avoiding the limitation to the fingerprint recognition caused by only setting the fingerprint recognition module in a specific position of the non-display region of the panel, and the solution is beneficial to realize the full screen of the panel, and improve the touch of the touch panel and the quality of fingerprint recognition.

Optionally, in the application, the first electrode pattern is a touch driving electrode, and the second electrode pattern is a touch sensing electrode; alternatively, the first electrode pattern is a touch sensing electrode, and the second electrode pattern is a touch driving electrode.

Optionally, in the application, the leads of the first electrode pattern and the second electrode pattern are generally led from one side or both sides to connect to different pins. The connection structures of the lead of the fingerprint driving electrode and the lead of the fingerprint sensing electrode can be designed according to the screen of the actual touch panel. It should be noted that, in the case that the fingerprint recognition film layer is not directly in contact with the touch film layer, the extraction mode of the leads of the fingerprint recognition film layer can be designed according to actual needs, such as direct extraction or punching and the like.

Optionally, in the application, in the fingerprint recognition film layer, the leads of each fingerprint driving electrode are correspondingly connected to different first pins, and the leads of each fingerprint sensing electrode are correspondingly connected to different second pins.

Referring to FIG. 2(a). FIG. 2(a) is a partial schematic structural view of a touch panel provided by the application. FIG. 2(a) only shows: touch driving electrodes TX1 to TX2, each of which extends in the horizontal direction and are arranged respectively in two rows; touch sensing electrodes RX1 to RX2, each of which extends in the longitudinal direction and are arranged in two columns. In the touch panel, the shape of the electrodes of the touch driving electrode and the touch sensing electrode is a transparent block shape, preferably a diamond block shape, to avoid shielding and ensure the display quality.

The touch driving electrode TX1, the touch driving electrode TX2, the touch sensing electrode RX1, and the touch sensing electrode RX2 intersect with each other, the touch driving electrode TX1 and the touch driving electrode TX2 are electrode patterns respectively formed by connecting three electrode units S, the touch sensing electrode RX1 and the touch sensing electrode RX2 are electrode patterns respectively formed by connecting two electrode units S. Taking the electrode unit S1 as an example, a fingerprint recognition pattern 1 is embedded in the hollow region. The fingerprint recognition pattern 1 is arranged with three fingerprint driving electrodes tx1 to tx3 extending along a boundary of the hollow region, and two fingerprint sensing electrodes rx1 to rx2 extending along adjacent boundaries of the hollow region; similarly, the fingerprint recognition pattern 2 is embedded in the hollow region of the electrode unit S2. The fingerprint recognition pattern 2 is arranged with three fingerprint driving electrodes tx1 to tx3 extending along a boundary of the hollow region, and two fingerprint sensing electrodes rx3 to rx4 extending along adjacent boundaries of the hollow region; a fingerprint recognition pattern 3 is embedded in the hollow region of the electrode unit S3. The fingerprint recognition pattern 3 is arranged with three fingerprint driving electrodes tx4 to tx6 extending along a boundary of the hollow region, and two fingerprint sensing electrodes rx5 to rx6 extending along adjacent boundaries of the hollow region; similarly, the other electrode units are also connected to the leads in a similar manner. The fingerprint driving electrodes tx1 to tx6 indicate that the same type of pins are connected, for example, the first pin, and the different labels thereof represent different first pins; the fingerprint driving electrodes rx1 to rx4 indicate that the same type of pins are connected, for example, the second pins, and the different labels thereof represent different second pins.

Therefore, the leads of the fingerprint driving electrodes in each extending direction are correspondingly connected to different first pins, and the leads of the fingerprint sensing electrodes in each extending direction are correspondingly connected to different second pins, which can be ensured that the fingerprint recognition patterns can be used cooperatively with each other. When the central spacing of adjacent hollow regions is small, a plurality of fingerprint recognition patterns can be used together to collect one fingerprint and combined into corresponding fingerprint information. The structural design of the touch panel can be applied to the dense fingerprint recognition pattern, and the sensitivity of fingerprint recognition of the structural design is higher.

Optionally, in the application, in every fingerprint recognition pattern, the leads of each fingerprint driving electrode are correspondingly connected to different first pins, and the leads of each fingerprint sensing electrode are correspondingly connected to different second pins; each of the fingerprint recognition patterns is provided with the fingerprint driving electrode and the fingerprint sensing electrode, the fingerprint driving electrodes from different fingerprint recognition patterns are commonly connected to the same first pin, and the fingerprint sensing electrodes from different fingerprint recognition patterns are commonly connected to the same second pin.

Specifically refer to FIG. 2(b). FIG. 2(b) is a schematic structural view showing a partial structure of the touch panel provided by the application, and the structure thereof is similar to that of FIG. 2(a), and details are not described herein any more.

The touch driving electrode TX1, the touch driving electrode TX2, the touch sensing electrode RX1, and the touch sensing electrode RX2 intersect with each other, the touch driving electrode TX1 and the touch driving electrode TX2 are electrode patterns respectively formed by connecting three electrode units S. The touch sensing electrode RX1 and the touch sensing electrode RX2 are electrode patterns respectively formed by connecting two electrode units S. Taking the electrode unit S1 as an example, a fingerprint recognition pattern 1 is embedded in the hollow region. The fingerprint recognition pattern 1 is arranged with three fingerprint driving electrodes tx1 to tx3 extending along a boundary of the hollow region, two fingerprint sensing electrodes rx1 to rx2 extending along adjacent boundaries of the hollow region. Similarly, the fingerprint recognition pattern 2 is embedded in the hollow region of the electrode unit S2. The fingerprint recognition pattern 2 is arranged with three fingerprint driving electrodes tx1 to tx3 extending along a boundary of the hollow region, two fingerprint sensing electrodes rx1 to rx2 extending along adjacent boundaries of the hollow region; a fingerprint recognition pattern 3 is embedded in the hollow region of the electrode unit S3, and the fingerprint recognition pattern 3 is arranged with three fingerprint driving electrodes tx1 to tx3 extending along a boundary of the hollow region, two fingerprint sensing electrodes rx1 to rx2 extending along adjacent boundaries of the hollow region; similarly, the other electrode units are also connected to the leads in a similar manner. The fingerprint driving electrodes tx1 to tx3 indicate that the same type of pins are connected, for example, the first pins, and the different labels thereof represent different first pins; the fingerprint driving electrodes rx1 to rx2 indicate that the same type of pins are connected, for example, the second pins, the different labels thereof represent different second pins.

Therefore, each fingerprint recognition pattern can be regarded as the same. Among the plurality of fingerprint driving electrodes, the fingerprint driving electrodes with the same label are correspondingly connected to the same first pin; among the plurality of fingerprint sensing electrodes, the fingerprint sensing electrodes with the same label are correspondingly connected to the same second pin. In this way, the number of pins can be reduced and the design structure can be simplified. Moreover, each fingerprint recognition pattern can be used as an independent fingerprint recognition region for fingerprint recognition, thus the flexibility of the touch structural design can be improved. In fact, it is not limited thereto, and the fingerprint recognition patterns may be different.

In fact, in the application, the line widths of the fingerprint driving electrodes and the fingerprint sensing electrodes provided in each hollow region are relatively thin, and the corresponding leads are correspondingly thin, or the line width can be understood to be the same as that of the fingerprint driving electrodes and the fingerprint sensing electrodes. Referring to FIG. 2(c), taking the touch panel structure in FIG. 2(a) as an example, the fingerprint driving electrode tx1 in the hollow region S1 is connected to the fingerprint driving electrode tx1 in the hollow region S2, and is connected to the corresponding first pin by the leads of the fingerprint driving electrode tx1 located at either edge side. Similarly, other fingerprint driving electrodes or fingerprint sensing electrodes with the same label are also connected to each other in a similar manner and connected to the corresponding first pins through one lead, thereby avoiding the problems of the large wiring space caused by excessive lead extraction, and increased wiring complexity caused by more wiring and simplifying the touch panel structure.

Optionally, in the application, in the fingerprint recognition pattern, the lead of the fingerprint driving electrode and the lead of the fingerprint sensing electrode are drawn from any surface of the electrode unit; alternatively, the lead of the fingerprint driving electrode and the lead of the fingerprint sensing electrode are respectively drawn from both surfaces of the electrode unit.

Optionally, in the application, the electrode unit has a first hollow pattern; and the second hollow pattern is formed by the intersection of the fingerprint driving electrode and the fingerprint sensing electrode. The second hollow pattern is the same as the first hollow pattern.

Specifically refer to FIG. 3. Taking the electrode unit S being a metal grid electrode for an example, in fact, the first hollow pattern may be other patterns, and is not limited to a grid. Then, the second hollow pattern formed by the intersection of the corresponding fingerprint driving electrode 1211 and the fingerprint sensing electrode 1212 may also be a grid pattern. The size of the metal grid in the touch driving electrode 111 and the touch sensing electrode 112 may be the same as the size of the grid formed by the intersection of the fingerprint driving electrode 1211 and the fingerprint sensing electrode 1212. Therefore, the grid pattern can be evenly arranged in the touch panel to ensure the accuracy of fingerprint recognition and improve the accuracy of the touch.

Optionally, in the application, the touch panel further includes: a display film layer which includes a plurality of illuminating sub-pixels arranged in an array; in the fingerprint recognition pattern, the orthographic projection of each of the fingerprint driving electrode and/or each of the fingerprint sensing electrodes on the touch panel does not coincide with the orthographic projection of the illuminating sub-pixels in the display film layer on the touch panel.

Figure 4:
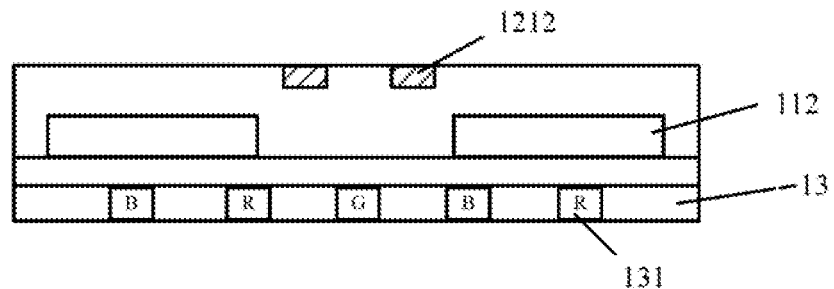
FIG. 4 is a cross-sectional schematic structural view of a touch panel provided by an embodiment of the application.

Specifically, referring to FIG. 4, FIG. 4 is a cross-sectional structural view taken along the sectioning line a-a of FIG. 3. Taking the display film layer 13 being located under the touch film layer 11 and the fingerprint recognition film layer 12 being located above the touch film layer 11 as an example, the display film layer 13 includes a illuminating sub-pixel 131. In the fingerprint recognition pattern, the orthographic projection of the fingerprint sensing electrode 1212 on the touch panel does not coincide with the orthographic projection of and the illuminating sub-pixel 131 of the display film layer 13 on the touch panel. Therefore, the fingerprint recognition pattern can reasonably avoid the illuminating sub-pixels, avoid shielding the illuminating sub-pixels, ensure a superior luminous efficiency and display quality. An insulating layer is further arranged between the touch film layer and the display film layer, and an insulating layer is also arranged between the fingerprint recognition film layer and the touch film layer, both of which are shown in blank.

Optionally, in the application, the fingerprint recognition pattern is made of a transparent conductive material or a metal material. Since the line width of the fingerprint recognition pattern is thin, the two materials involved in the application can avoid the illuminating sub-pixels to a certain extent and avoid shielding.

Optionally, in the touch film layer, a central spacing of adjacent electrode units ranges from 3 to 7 mm; and in the fingerprint recognition film layer, a central spacing of adjacent fingerprint recognition patterns ranges from 3 to 7 mm.

In fact, in the application, the above size range is not uniquely defined, and the size of the fingerprint recognition pattern in the fingerprint recognition film layer is related to the module structure of the touch panel, the thickness of the cover plate, and the screen resolution.

It should be noted that the fingerprint recognition method of the fingerprint recognition pattern involved in the application is capacitive fingerprint recognition, and a fingerprint image is obtained by the influence and recognition of the capacitance between the fingerprint driving electrode and the fingerprint sensing electrode by the ridge rib of the fingerprint.

In the meantime, the application further provides a touch display device, including the touch panel according to any of the above items. In addition, the touch display device can be any product or component having a display function, such as a mobile phone, a tablet computer, a television, a display, a notebook computer, a digital photo frame, a navigator, a smart wearable device, and the like. Other indispensable components of the display device possessed can be understood by a person skilled in the art, and are not described herein, nor should they be construed as an limitation to the application.

In addition, the application also provides a method for manufacturing a touch panel, including: forming a plurality of first electrode patterns extending in the first direction, a plurality of electrode units arranged in the second direction, and first fingerprint electrodes insulatedly embedded in the hollow regions of each of the electrode units; forming a first insulating layer, and forming a first via hole on both sides of each electrode unit distributed corresponding to the second direction; forming a second fingerprint electrode which is insulated and intersect with the first fingerprint electrode, and forming a bridge unit at the first via hole of the adjacent electrode unit.

In fact, when formed, the touch panel can be produced in the following process sequence: step 1, forming a first electrode pattern and a second electrode pattern, and a first fingerprint electrode embedded in the hollow region of the electrode unit of the first electrode pattern and the second electrode pattern, the first fingerprint electrode may be a fingerprint driving electrode or a fingerprint sensing electrode; step 2, forming an insulating layer, forming via holes on both sides of the electrode unit of the second electrode pattern, and forming via holes on one side of the first fingerprint electrode; step 3, forming a bridge unit connecting adjacent electrode units of the second electrode pattern, and the bridge unit penetrating the via hole, and simultaneously forming a second fingerprint electrode, leads of the first fingerprint electrode and leads of the second fingerprint electrode.

In the above solution, the leads of the fingerprint recognition pattern are made at the same side. In fact, the leads of the fingerprint recognition pattern can be separately made at both sides, and the specific manufacturing process includes: step 1, forming a first electrode pattern and a second electrode pattern, a first fingerprint electrode and leads of the first fingerprint electrode embedded in the hollow region of the electrode unit of the first electrode pattern and the second electrode pattern, the first fingerprint electrode may be a fingerprint driving electrode or a fingerprint sensing electrode; step 2, forming an insulating layer, forming via holes on both sides of the electrode unit of the second electrode pattern, and forming via holes on one side of the first fingerprint electrode; step 3, forming a bridge unit connecting adjacent electrode units of the second electrode pattern, and the bridge unit penetrating the via hole, and simultaneously forming a second fingerprint electrode and leads of the second fingerprint electrode.

Figure 5:
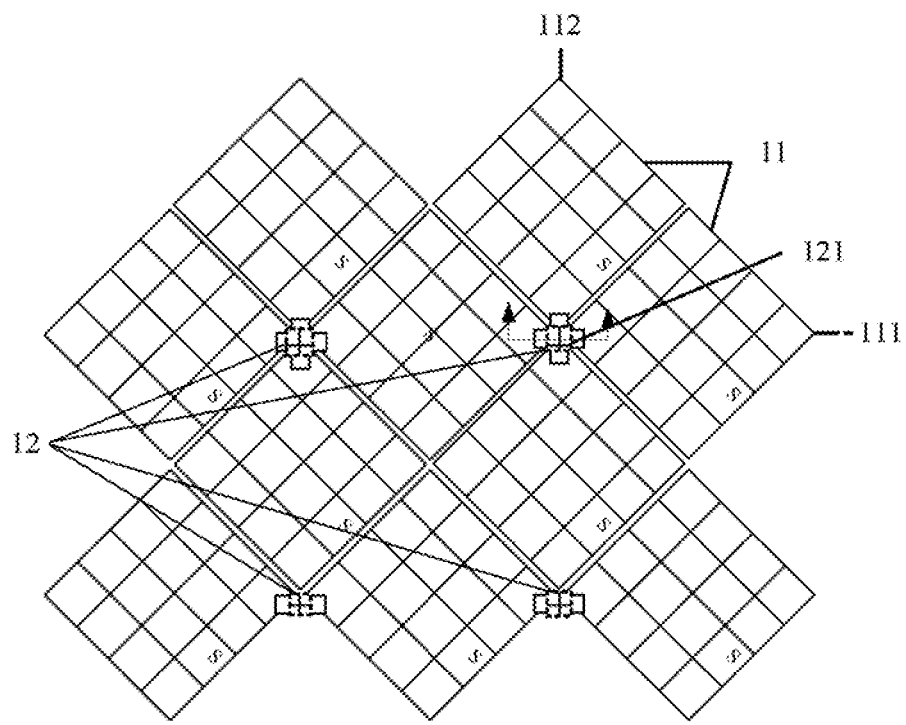
FIG. 5(a) is a first cross-sectional schematic structural view of a touch panel provided by another embodiment of the application.
FIG. 5(b) is a cross-sectional schematic structural view of a single fingerprint recognition pattern in a touch panel provided by another embodiment of the application.

Another embodiment of the application is shown in FIG. 5(*a*). FIG. 5(*a*) is a schematic structural view of a touch panel provided by another embodiment of the application. The touch panel mainly includes: a touch film layer 11 and a fingerprint recognition film layer 12. The fingerprint recognition film layer 12 may be arranged on the touch film layer 11 or on other film layers, or may be arranged at either side of the touch film layer. In FIG. 1, take the fingerprint recognition film layer 12 arranged at the light emitting surface side of the touch film layer 11 as an example:

The fingerprint recognition film layer 12 includes a plurality of fingerprint recognition patterns 121 arranged in an array. An orthographic projection of the fingerprint recognition patterns 121 on the touch panel at least partially coincides with the orthographic projection of the first electrode 111 and the second electrode 112 in the touch film layer 11 on the touch panel.

In the application, the materials of the first electrode 111 and the second electrode 112 in the touch film layer 11 are not limited, and may be a transparent conductive material or a metal material. The following solutions in the application are described by taking the touch film layer 11 using a metal material as an example. The first electrode 111 and the second electrode 112 of the touch film layer 11 can reasonably avoid the illuminating sub-pixels of the display film layer, and ensure that the touch panel emits light. When a transparent conductive material is used as the material of the touch film layer, the problem of shading can be completely avoided, and the luminous efficiency of the touch panel can be effectively ensured.

When the fingerprint recognition pattern is densely distributed, the orthographic projection of the fingerprint recognition pattern on the touch panel partially coincides with the orthographic projection of the first electrode and the second electrode in the touch film layer on the touch panel.

In fact, it should be noted that, in the application, considering the flexible bending characteristics of the touch panel, the material of the touch film layer 11 may be selected from a metal material; as shown in FIG. 5(*b*). FIG. 5(*b*) is a schematic view of a partial cross-sectional structure of the touch panel taken along a sectioning line a-a of FIG. 5(*a*); the touch panel further includes: a display film layer 13 in which a plurality of illuminating sub-pixels 131 arranged in an array are arranged. In order to prevent the touch film layer 11 from shielding the emergent light of the illuminating sub-pixel 131, a first metal electrode 111 and a second metal electrode 112 in the touch film layer 11 may be arranged in the gap of the corresponding adjacent illuminating sub-pixels 131, i.e., the orthographic projection of the electrode pattern (the first metal electrode 111 and the second metal electrode 112) in the touch film layer 11 on the touch panel does not coincide with the orthographic projection of the illuminating sub-pixel 131 in the display film layer 13 on the touch panel.

Based on the above structure, the fingerprint recognition film layer is also made of a metal material. The fingerprint recognition of the entire screen is realized by arranging a plurality of fingerprint recognition patterns on the touch panel. The fingerprint recognition film layer being arranged on the position corresponding to the electrode pattern in the corresponding touch film layer can prevent the fingerprint recognition film layer from shielding the emergent light of the illuminating sub-pixel in the display film layer, thereby ensuring the luminous efficiency of the touch panel and improving the quality of the touch panel while realizing the fingerprint recognition of full screen.

Optionally, the fingerprint recognition pattern includes a first fingerprint recognition pattern; an orthographic projection of the first fingerprint recognition pattern on the touch panel is located in an insulating and intersecting region of the first metal electrode and the second metal electrode.

In the application, the fingerprint recognition film layer may be arranged on either surface of the touch film layer or may be insulatedly arranged between the first metal electrode and the second metal electrode of the touch film layer. Specifically, as shown in FIG. 6, in order to facilitate description, taking the fingerprint recognition film layer 12 being arranged on the illuminating surface of the touch film layer 11 as an example, the fingerprint recognition film layer 12 includes a plurality of fingerprint recognition patterns 121 which include first fingerprint recognition patterns 121*a*. The first fingerprint recognition patterns 121*a* are arranged in an insulating and intersecting region of the first metal electrode 111 and the second metal electrode 112 of the touch film layer 11 (shown by a broken line frame in FIG. 6). The area of the first fingerprint recognition pattern is 1-4 mm. Since the insulating and intersecting region of the first metal electrode 111 and the second metal electrode 112 in the touch film layer 11 avoids the illuminating sub-pixel, and further, the first fingerprint recognition pattern 121*a* being arranged in the insulating and intersecting region does not shielding the emergent light of the illuminating sub-pixel.

It should be noted that an area of the insulating and intersecting region of the first metal electrode 111 and the second metal electrode 112 is approximately 1-4 mm$^2$, and the central spacing between adjacent insulating and intersecting region is approximately 4 mm, and the area of the fingerprint of the finger is approximately 1 cm$^2$, so that complete fingerprint information can be collected by about 4-16 fingerprint recognition patterns.

Optionally, the fingerprint recognition pattern includes a second fingerprint recognition pattern; the first metal electrode and the second metal electrode both include a plurality of grid electrodes with a hollow pattern. The orthographic projection of the second fingerprint recognition pattern on the touch panel coincides with the orthographic projection of the hollow pattern of the grid electrode on the touch panel. In fact, in view of the actual process implementation, there may be a case that the orthographic projection of the second fingerprint recognition pattern on the touch panel partially coincides with the orthographic projection of the hollow pattern of the grid electrode on the touch panel.

Specifically, referring to FIG. 7(*a*), the first metal electrode 111 and the second metal electrode 112 in the touch film layer 11 both include a plurality of diamond electrodes S with a hollow pattern, the shape of the hollow pattern is not limited. The application takes a grid pattern as an example. The fingerprint recognition film layer 12 includes a plurality of fingerprint recognition patterns 121 which include a second fingerprint recognition pattern 121*b*. The second fingerprint recognition patterns 121*b* are arranged at a position corresponding to the hollow pattern of the diamond electrode S of the touch film layer 11; as shown in FIG. 7(*b*), FIG. 7(*b*) is a schematic view of the cross-sectional structure of the touch panel taken along the sectioning line b-b in FIG. 7(*a*). The orthographic projection of the second fingerprint recognition pattern 121*b* on the touch panel coincides with the orthographic projection of the hollow pattern of the diamond electrode S on the touch panel. The area of the second fingerprint recognition pattern is 1-16 mm$^2$. Since the hollow pattern of the diamond electrode S in the touch film layer 11 avoids the illuminating sub-pixel, the second fingerprint recognition pattern 121*b* being arranged in a position corresponding to the hollow pattern does not shield the emergent light of the illuminating sub-pixel.

It should be noted that the site of the diamond electrode S is 16 mm$^2$, the central spacing between adjacent diamond electrodes S is about 4 mm, and the area of the fingerprint of the finger is about 1 cm², so that complete fingerprint information can be collected by about 4-8 fingerprint recognition patterns.

Figure 8:
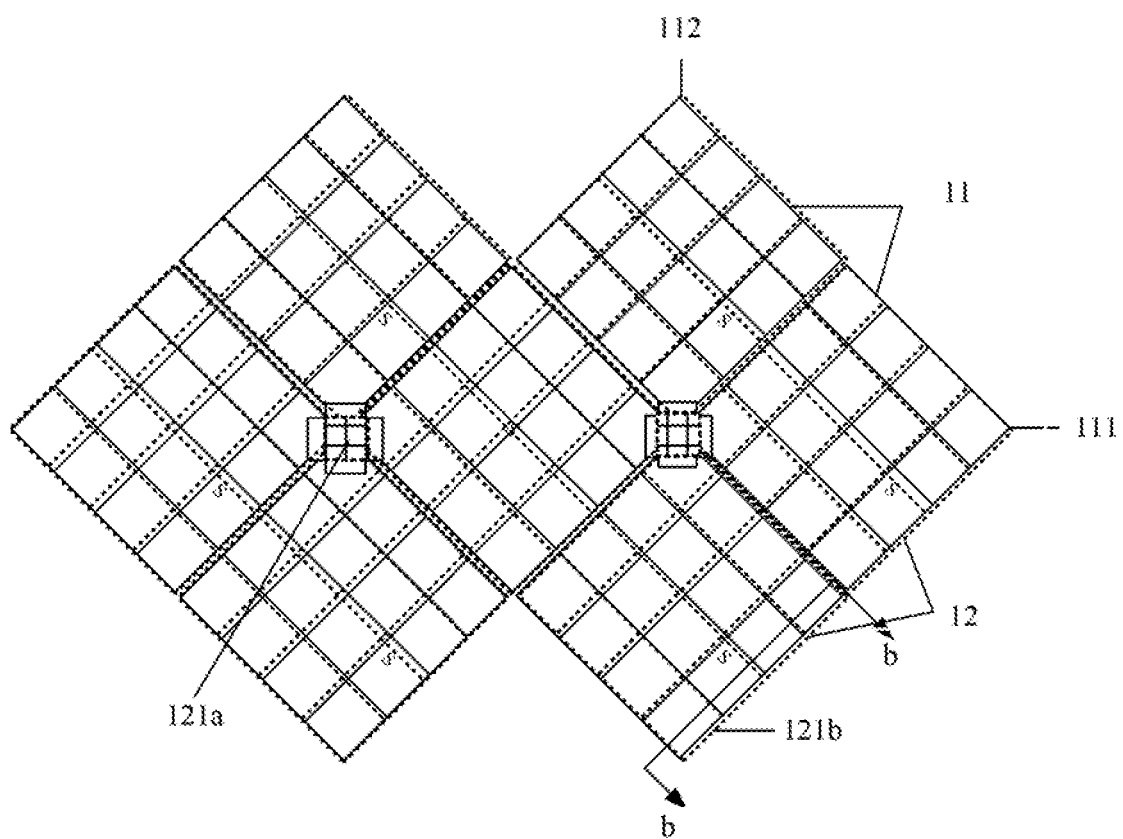
FIG. 8 is a third schematic structural view of a touch panel provided by another embodiment of the application.

Alternatively, referring to FIG. 8, the first metal electrode 111 and the second metal electrode 112 in the touch film layer 11 both include a plurality of diamond electrodes S with a hollow pattern; the fingerprint recognition film layer 12 includes a plurality of fingerprint recognition patterns 121 which include a first fingerprint recognition pattern 121a and a second fingerprint recognition pattern 121b. The first fingerprint recognition pattern 121a is arranged on an insulating and intersecting region 112 (shown by a broken circle frame in FIG. 8) of the first metal electrode 111 and the second metal electrode 112 on the touch film layer 11. The second fingerprint recognition pattern 121b is arranged at a position corresponding to the hollow pattern of the diamond electrode S of the touch film layer 11 (shown by a dashed line frame in FIG. 8). The area of the first fingerprint recognition pattern is 1-4 mm², and the area of the second fingerprint recognition pattern is 1-16 mm². The design solution can ensure that more fingerprint recognition patterns are arranged on the touch panel, fingerprint recognition pattern can be arranged on the intersection region of the first metal electrode and the second metal electrode or on a position corresponding to the first metal electrode and/or the second metal electrode, to improve the sensitivity of fingerprint recognition on the touch panel.

Figure 9:
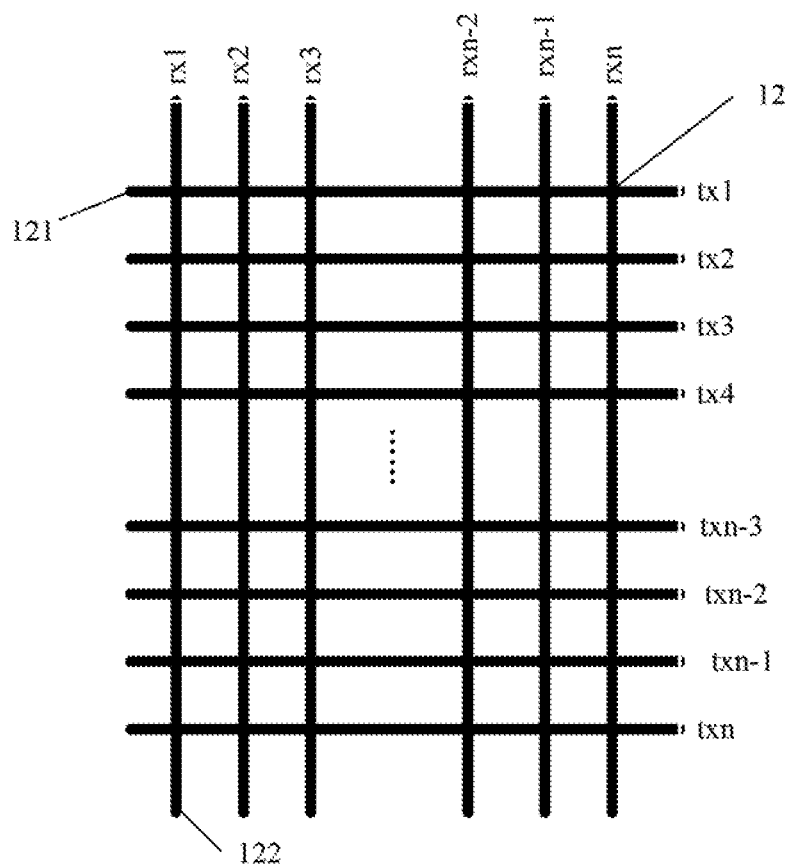
FIG. 9 is a schematic structural view of a fingerprint recognition pattern in a touch panel provided by another embodiment of the application.

Optionally, in the application, the fingerprint recognition mode of the fingerprint recognition pattern is capacitive. Referring to FIG. 9, the fingerprint recognition pattern 12 includes a plurality of third metal electrodes 121 and a plurality of fourth metal electrodes 122 which are insulated and intersect with the third metal electrodes 121. The third metal electrode 121 and the fourth metal electrode 122 have a line width ranging from 3-5 μm. A fingerprint recognition pattern may include at least one hundred third metal electrodes 121 and one hundred fourth metal electrodes 122, thereby forming a dense intersection structure, which facilitates improving the accuracy of fingerprint collection. In the embodiment, only the tx1 to txn third metal electrode 121 extending in the lateral direction and the rx1 to rxn fourth metal electrode 122 extending in the longitudinal direction are shown.

It should be noted that, in the application, the extending direction of the first metal electrode of the touch film layer is defined as a first direction, the extending direction of the second metal electrode is defined as a second direction, and the extending direction of the third metal electrode in the fingerprint recognition pattern is defined as a third direction, and the extending direction of the fourth metal electrode is defined as a fourth direction. There may be the case: the first direction is the same as the third direction, and the second direction is the same as the fourth direction; alternatively, the first direction, the second direction, the third direction, and the fourth direction may intersect with each other.

Optionally, in the application, the first metal electrode and the second metal electrode in the touch film layer are intersected in the same layer, or overlapped in the different layers. Referring to FIG. 10(a), the first metal electrode 111 and the second metal electrode 112 are arranged in the same layer, and the diamond electrodes S of the second metal electrode 112 are connected by a bridge structure, and the first metal electrode 111 and the second metal electrode 112 are insulated and intersect with each other at the bridge structure. Alternatively, referring to FIG. 10(b), the first metal electrode 111 and the second metal electrode 112 are arranged in different layers, the first metal electrode 111 is arranged on the bottom layer, and the second metal electrode 112 is arranged on the top layer.

Optionally, an orthographic projection of the leads connecting the fingerprint recognition pattern on the touch panel coincides with orthographic projection of the first metal electrode and/or the second metal electrode in the touch film layer on the touch panel.

In the application, in order to further ensure that the emergent light of the illuminating sub-pixel in the display film layer is not shielded by the fingerprint recognition film layer, it may be considered that the leads drawn from the fingerprint recognition pattern is arranged at the electrode pattern corresponding to the touch film layer. In the specific implementation, the leads may be arranged at and drawn from a position corresponding to the first metal electrode of the touch film layer, that is, only along the position where the first metal electrode is located; or the leads are arranged at and drawn from a position corresponding to the second metal electrode of the touch film layer, that is, only along the position where the second metal electrode is located; or, the leads are arranged at a position corresponding to the first metal electrode and the second metal electrode of the touch film layer, that is, a part of one lead is arranged at a position where the first metal electrode is located, the other part is arranged at and drawn from the position where the second metal electrode is located.

Optionally, in the application, the fingerprint recognition pattern is arranged on either surface of the touch film layer or arranged between the first metal electrode and the second metal electrode of the touch film layer.

The above description is only an embodiment of the application and is not intended to limit the application. Various changes and modifications can be made to the application by a person skilled in the art. Any modifications, equivalents, improvements, etc. made within the spirit and principle of the application are intended to fall into the scope of the appended claims.

What is claimed is:

1. A touch panel, comprising:
a touch film layer and a fingerprint recognition film layer, and the touch film layer being insulated from the fingerprint recognition film layer;
wherein an orthographic projection of the fingerprint recognition film layer on the touch panel at least partially coincides with an orthographic projection of the touch film layer on the touch panel;
wherein the touch film layer comprises a plurality of first electrode patterns extending along a first direction and a plurality of second electrode patterns extending along a second direction, the fingerprint recognition film layer comprises a plurality of fingerprint recognition patterns, and the fingerprint recognition film layer is arranged at either side of the touch film layer, or the fingerprint recognition film layer is arranged between the plurality of first electrodes and the plurality of second electrodes of the touch film layer;
wherein each electrode unit of the first and second electrode patterns comprises a hollow region, wherein the plurality of second electrode patterns of the touch film layer are insulated and intersecting with the plurality of first electrode patterns of the touch film layer, wherein the plurality of fingerprint recognition patterns are arranged such that an orthographic projection of the plurality of fingerprint recognition patterns on the touch panel are located in at least one hollow region of the plurality of first and second electrode patterns of the touch film layer;

wherein, the first and second electrode patterns are touch driving electrodes and touch sensing electrodes, and the fingerprint recognition pattern is embedded insulatively in the hollow region of an electrode unit of the touch driving electrode and the touch sensing electrode.

2. The touch panel according to claim 1, wherein the fingerprint recognition film layer comprises a plurality of fingerprint recognition patterns arranged in an array, wherein the touch film layer comprises a plurality of first electrodes and a plurality of second electrodes, and wherein the plurality of fingerprint recognition patterns are arranged such that an orthographic projection of the fingerprint recognition pattern on the touch panel at least partially coincides with an orthographic projection of the plurality of first electrodes and the second electrodes in the touch film layer on the touch panel.

3. The touch panel according to claim 2, wherein the plurality of fingerprint recognition patterns comprise a first fingerprint recognition pattern;
wherein the first fingerprint recognition pattern is arranged such that an orthographic projection of the first fingerprint recognition pattern on the touch panel is located at an insulating and intersecting region of the plurality of first electrodes and the plurality of second electrodes.

4. The touch panel according to claim 2, wherein the plurality of fingerprint recognition patterns comprises a second fingerprint recognition pattern;
wherein each of the plurality of first electrodes and the plurality of second electrodes comprises a plurality of grid electrodes with a hollow pattern,
wherein the plurality of grid electrodes with a hollow pattern are arranged such that an orthographic projection of the second fingerprint recognition pattern on the touch panel coincides with an orthographic projection of the hollow pattern of the grid electrode on the touch panel.

5. The touch panel according to claim 2, wherein the plurality of fingerprint recognition patterns comprise a plurality of third metal electrodes and a plurality of fourth metal electrodes being insulated and intersecting with the third metal electrodes; and a line width of the plurality of third metal electrodes and the plurality of fourth metal electrodes is in a range of 3-5 μm.

6. The touch panel according to claim 2, wherein the plurality of first electrodes and the plurality of second electrodes in the touch film layer are arranged crossedly in a same layer.

7. The touch panel according to claim 2, wherein the plurality of first electrodes and the second electrodes in the touch film layer are arranged to overlap in different layers.

8. The touch panel according to claim 2, wherein the touch panel further comprises a lead connecting to the plurality of fingerprint recognition patterns, wherein the plurality of fingerprint recognition patterns is arranged such that an orthographic projection of the lead connecting to the plurality of fingerprint recognition patterns on the touch panel coincides with the orthographic projection of the plurality of first electrodes and/or the plurality of second electrodes in the touch film layer on the touch panel.

9. The touch panel according to claim 2, wherein the plurality of fingerprint recognition patterns are arranged between the plurality of first electrodes and the plurality of second electrodes of the touch film layer.

10. The touch panel according to claim 1, wherein the plurality of fingerprint recognition patterns comprise a plurality of fingerprint driving electrodes extending in a third direction, and a plurality of fingerprint sensing electrodes extending in a fourth direction; and the plurality of fingerprint driving electrodes are insulated and intersect with the plurality of fingerprint sensing electrode.

11. The touch panel according to claim 10, wherein in the fingerprint recognition film layer, leads of each of the plurality of fingerprint driving electrodes are connected to different first pins correspondingly, and leads of each of the plurality of fingerprint sensing electrodes are connected to different second pins correspondingly.

12. The touch panel according to claim 10, wherein in each of the plurality of fingerprint recognition patterns, leads of each of the plurality of fingerprint driving electrode are connected to different first pins correspondingly, and leads of each of the plurality of fingerprint sensing electrode are connected to different second pins correspondingly;
wherein each of the plurality of fingerprint recognition patterns is provided with a number of fingerprint driving electrodes and a number of fingerprint sensing electrodes,
wherein the number of fingerprint driving electrodes of different fingerprint recognition patterns are commonly connected to the same first pin, and the number of fingerprint sensing electrodes from different fingerprint recognition patterns are commonly connected to the same second pin.

13. The touch panel according to claim 10, wherein in the plurality of fingerprint recognition patterns, leads of the plurality of fingerprint driving electrodes and leads of the plurality of fingerprint sensing electrodes are drawn from either side of an electrode unit; or the leads of the plurality of fingerprint driving electrodes and leads of the plurality of fingerprint sensing electrodes are respectively drawn from both sides of the electrode unit.

14. The touch panel according to claim 10, further comprising: a display film layer, wherein the display film layer comprises a plurality of illuminating sub-pixels arranged in an array;
in the plurality of fingerprint recognition patterns, an orthographic projection of each the plurality of fingerprint driving electrodes and/or of each the plurality of fingerprint sensing electrodes on the touch panel does not coincide with an orthographic projection of the plurality of illuminating sub-pixels in the display film layer on the touch panel.

15. The touch panel according to claim 14, wherein the plurality of fingerprint recognition patterns are made of a transparent conductive material or a metal material.

16. The touch panel according to claim 10, wherein
in the touch film layer, a central spacing of adjacent electrode units ranges from 3 to 7 mm; and
in the fingerprint recognition film layer, a central spacing of adjacent fingerprint recognition patterns ranges from 3 to 7 mm.

17. The touch panel according to claim 1, wherein the hollow region is located in the center of the electrode unit.

18. A method of manufacturing a touch panel, comprising:
forming a touch film layer, wherein the touch film layer comprises at least one predetermined hollow region, a plurality of first electrode patterns extending along a first direction, and a plurality second electrode patterns extending along a second direction;
forming a fingerprint recognition film layer, wherein the fingerprint recognition film layer comprises a plurality of fingerprint recognition patterns arranged in an array; and the fingerprint recognition film layer is arranged at either side of the touch film layer, or the fingerprint recognition film layer is arranged between the plurality of first electrodes and the plurality of second electrodes of the touch film layer;

wherein the at least one predetermined hollow region and the plurality of fingerprint recognition patterns are arranged such that an orthographic projection of the plurality of fingerprint recognition patterns on the touch panel are located in the at least one predetermined hollow region of the touch film layer, and the fingerprint recognition pattern is embedded insulatively in the hollow region of an electrode unit of the touch driving electrode and the touch sensing electrode.

19. A touch panel, comprising:

a touch film layer; wherein the touch film layer comprises at least one predetermined hollow region, a plurality of first electrode patterns extending along a first direction, and a plurality second electrode patterns extending along a second direction; and a fingerprint recognition film layer, wherein the fingerprint recognition film layer comprises a plurality of fingerprint recognition patterns arranged in an array; and the fingerprint recognition film layer is arranged at either side of the touch film layer, or the fingerprint recognition film layer is arranged between the plurality of first electrodes and the plurality of second electrodes of the touch film layer;

wherein the at least one predetermined hollow region and the plurality of fingerprint recognition patterns are arranged such that an orthographic projection of the plurality of fingerprint recognition patterns on the touch panel are located in at least one predetermined hollow region of the touch film layer, and the fingerprint recognition pattern is embedded insulatively in the hollow region of an electrode unit of the touch driving electrode and the touch sensing electrode.

* * * * *